United States Patent
Chumokhvalov et al.

(10) Patent No.: US 8,944,691 B2
(45) Date of Patent: Feb. 3, 2015

(54) BEARING DEVICE

(76) Inventors: Andrey Michailovich Chumokhvalov, St. Petersburg (RU); Victor Sergeevich Lisitsin, St. Petersburg (RU)

(*) Notice: Subject to any disclaimer, the term of this patent is extended or adjusted under 35 U.S.C. 154(b) by 31 days.

(21) Appl. No.: 13/336,357

(22) Filed: Dec. 23, 2011

(65) Prior Publication Data
US 2012/0224800 A1 Sep. 6, 2012

Related U.S. Application Data
(63) Continuation of application No. PCT/RU2010/000289, filed on May 27, 2010.

(30) Foreign Application Priority Data
Jun. 25, 2009 (RU) .................. 2009125511

(51) Int. Cl.
- *F16C 33/66* (2006.01)
- *F16C 19/08* (2006.01)
- *F16C 33/38* (2006.01)
- *F16C 19/54* (2006.01)
- *F16H 57/04* (2010.01)

(52) U.S. Cl.
CPC ......... *F16C 33/6659* (2013.01); *F16C 33/3806* (2013.01); *F16C 19/54* (2013.01); *F16H 57/0479* (2013.01)
USPC ............................ 384/473; 384/470; 384/504

(58) Field of Classification Search
USPC ......... 384/467, 470, 473, 504, 572, 586, 609, 384/619; 416/129, 170 R
See application file for complete search history.

(56) References Cited

U.S. PATENT DOCUMENTS

| | | | |
|---|---|---|---|
| 4,342,488 A | | 8/1982 | Anderson |
| 4,563,129 A | * | 1/1986 | Pagluica .................... 416/129 |
| 4,869,801 A | * | 9/1989 | Helms et al. ............. 204/298.15 |
| 5,547,060 A | * | 8/1996 | Giese ...................... 192/110 B |
| 2008/0078647 A1 | * | 4/2008 | Watanabe et al. ........... 192/41 A |
| 2011/0236193 A1 | * | 9/2011 | Chriss et al. ................. 384/467 |

FOREIGN PATENT DOCUMENTS

| | | |
|---|---|---|
| CN | 2320835 Y | 5/1999 |
| EP | 0188666 A2 | 7/1986 |
| GB | 1328818 | 9/1973 |
| JP | 4181018 A | 6/1992 |
| RU | 2216659 C2 | 11/2003 |
| SU | 1036981 A1 | 8/1983 |
| SU | 1328595 A1 | 8/1987 |
| SU | 1766468 A1 | 10/1992 |

OTHER PUBLICATIONS
International Search Report, mailed Oct. 7, 2010, from International Application No. PCT/RU2010/000289 filed May 27, 2010.

* cited by examiner

*Primary Examiner* — Marcus Charles
(74) *Attorney, Agent, or Firm* — Patentbar International, P.C.

(57) ABSTRACT

The support assembly contains a shaft in the form of a shallow pipe. At the ends of the shaft, separated from each other, roller bearings are installed. Their inner rings are mounted on the shaft, and the outer rings are installed in the body. Roller bodies are placed between the rings. If a cogged cage is used, they are separated by the cage teeth. The tubular support of the cage slides along the rigidly fastened cylindrical rod. Oil is supplied under pressure to the passage of the cylindrical rod. The roller bearings receive loads transferred to them from the shaft, and the support sliding over the rod form together a friction bearing which compensates for the harmful impacts of the centrifugal forces on the cage.

8 Claims, 1 Drawing Sheet

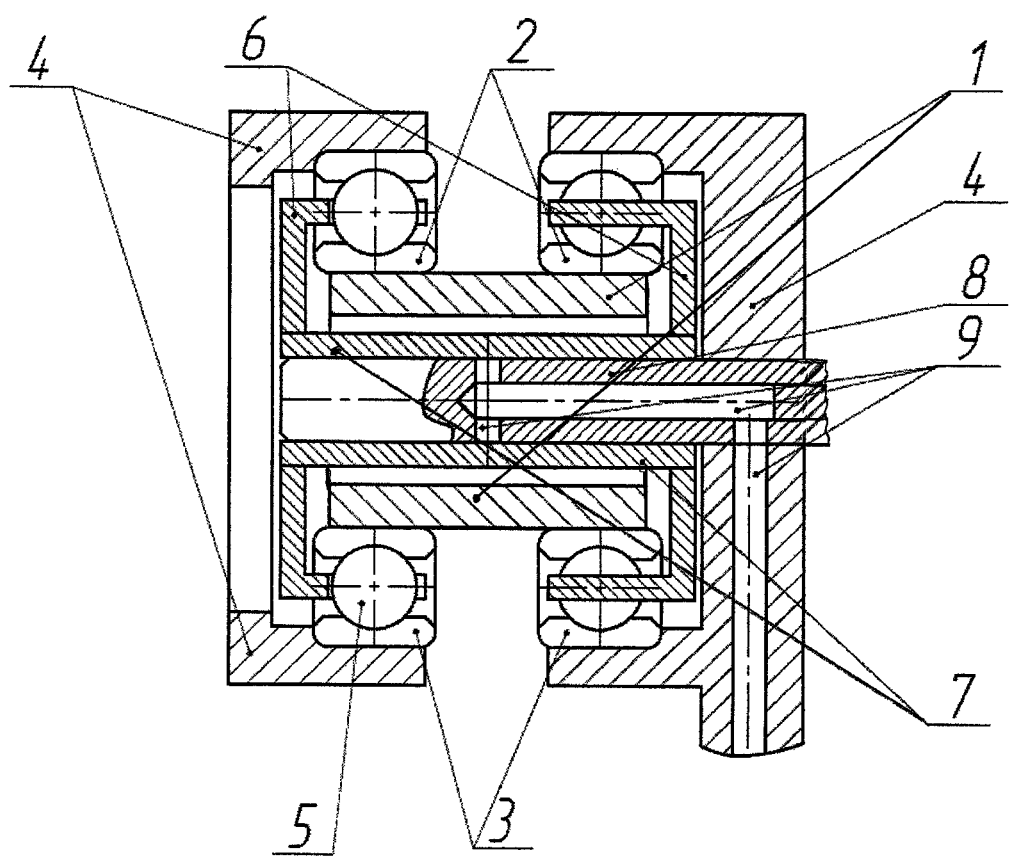

BEARING DEVICE

RELATED APPLICATIONS

This application is a Continuation of International Application No. PCT/RU2010/000289 filed on May 27, 2010, which claims priority to Russian Patent Application No. RU2009125511, filed Jun. 25, 2009, both of which are incorporated herein by reference in their entirety.

FIELD OF THE INVENTION

The invention belongs to machine building, in particular to mounting assemblies in which roller bearings are used. The invention can be used in machines and mechanisms where bearing assemblies operate with high speeds and are exposed to significant centrifugal loads, in particular in planetary reduction gearing units, planetary gearboxes, planetary centrifugal mills where strong artificial gravity fields exist.

BACKGROUND OF THE INVENTION

A rolling bearing is known from the USSR inventor's certificate No. 176468 dated 20 Mar. 1963, international patent classification: F 06C. The above rolling bearing contains inner and outer rings, rolling elements, a cage in the form of a cartridge with teeth on one end. Asymmetric design due to a loose fit of the cartridge bushing on one shaft end is a drawback of the bearing, because in causes cage misalignment. Besides, this design does not provide for the oil supply to the bearing which limits its life time and application area only to low rotation frequencies and low centrifugal overloads.

A bearing is known from the USSR inventor's certificate No. 1328595 dated 13 Jun. 1984, international patent classification: F16 C19/54 which contains a rolling bearing on a shaft and a cogged cage which has an elongated component extending beyond the bearing limits. Additionally a bushing is fastened on the shaft.

It has a collar enveloping the elongated part of the cage. A cavity for bearing lubrication is provided inside the bushing. During operation lubricant from the cavity reaches the bushing, then the cage, bearing and shaft. However, with such a design in addition to spot friction forces between the cage teeth and rolling bodies additional surface friction forces between the outer surfaces of the cage elongated parts and the inner surface of the bushing collar occur. It results in the increase of losses to friction and heat emission associated with it. Losses repeatedly increase due to high centrifugal overloads in planetary mechanisms which causes bearing overheating and jamming. Besides, lubricant quantity is limited by the volume of the lubrication cavity. In order to fill the cavity it is necessary to disassemble the mechanism. It complicates mechanism operation.

The above drawbacks are eliminated in the design of the bearing assembly supported by the patent for an invention No. 2216659 RU of 19 Oct. 2001, international patent classification F16C19/54. The assembly contains a body and a shaft placed inside. A rolling bearing and a cogged cage are installed on the shaft. In addition the assembly is equipped with two coaxial bushings one of which is tightly installed on the shaft and the other one is fastened on the body. The cage is placed in a cylindrical slit between these bushings. The body, shaft and bushings are equipped with interconnected passages for lubricant supply to the cage where there are openings for oil reach. Oil is supplied continuously from an external source.

Such a design reduces friction losses on the cage surface which slides on the oil film between surfaces of the bushing. This allows the cage to withstand practically any loads. Cage location between the additional bushings excludes high-frequency vibrations of the cage caused by bending occurrences and eliminates the fatigue effect on assembly materials. This increases the assembly life time and operating reliability.

However, when a high-speed and high-power load is attached to the shaft, the design of its mounting assembly does not exclude misalignments of bearing rotation axes. It causes their jamming and reduces assembly functional capacity and its application field.

A design with two and more bearings is considered to be the most reliable. In this case the load is connected to the shaft between the bearings and evenly distributed between them. Such arrangement excludes misalignment of bearing rotation shafts and allows increasing the unit life time.

The design of the bearing assembly with two bearings rested on a shaft is given in the FIGURE attached to the above patent No. 2216659. However, to coaxial bushings are located between the bearings, and the cogged cage body is placed between them. It excludes the attachment of a loading gear to the shaft between the bearings.

An example of a mounting assembly with two bearings is given in the RU patent for invention No. 1036981 of 27 May 1982, international patent classification: F16H1/28; 57/08 (prototype). The unit contains a hollow shaft with inner rings of two symmetrical rolling bearings. The rings are fastened on the shaft at intervals. Outer rings of the bearing are installed on the body. Bearing rolling bodies are separated by cages which may be supported either by rolling bodies or by inner or outer rings of the bearings.

However, such designs can work only with low centrifugal speeds and small overloads.

When operating with high speeds cages are exposed to strong centrifugal overloads which are transferred to the components supporting the cages. Contact area of the cage supporting parts with either rolling bodies or rings is very small, thus, even with flood lubrication, it causes strong overheating and wear of both cages and bearing rings, as well as rolling bodies of the bearings. It certainly causes a rapid break down of the assembly and the whole mechanism.

SUMMARY OF THE INVENTION

The purpose of the proposed design is to improve the reliability and durability of the bearing assembly, increase the specific speed and extend the life time.

In order to achieve this assigned goal the design of the cage support, on which at least two roller bearings with cages are mounted at intervals, is modified. In the proposed design the support of the cages is arranged as a hollow pipe and located inside the shaft coaxially to the shaft and the cylindrical rod which is fastened on the body and equipped with oil supply passages.

Cage support may be placed on the cylindrical rod with a gap, or the cylindrical rod may be placed with a gap on the cage support.

In the proposed design various solutions for the cage separating part may be used; in particular, they can be toothed or riveted.

The cage support and the cylindrical rod may corbel out of the body limits; also, it is possible to design separate cage supports.

In order to reduce friction load cages are installed with a gap in relation to the rings of the roller bearings. Fastening of the cages on the support passing inside the hollow shaft substitutes zu the friction between the support and the shaft with the friction between the support and the cylindrical rod located inside the shaft. In this case, due to the decrease of the diameter of contact surfaces friction losses and the linear speed of support sliding movement are reduced, and the load uniformity increases. Besides, due to the support location inside the shaft overall dimensions and weight of the assembly components decrease which reduces the inertia of components rotation and increases the specific speed. Continuous oil supply to the moving parts of the support assembly ensures a long-term uninterrupted operation of the mechanism.

BRIEF DESCRIPTION OF THE DRAWING FIGURES

The proposed support assembly is presented on the drawing, FIG. 1, where a longitudinal section of the assembly is shown.

The support assembly contains the shaft 1 in the form of a shallow pipe. At the ends of the shaft, separated from each other, roller bearings are installed. Their inner rings 2 are mounted on the shaft 1, and the outer rings 3 are installed in the body 4. Roller bodies 5 are placed between the rings. If a cogged cage is used, they are separated by the cage teeth. Other types of cages, in particular, riveted ones, may be used in this design.

Cage support 7 is also represented by a hollow pipe which is mounted coaxially inside the pipe of the shaft 1. The pipe of the cage support 7 is mounted with a gap on the cylindrical rod 8 which is fastened on the body 4. Alternatively, it is possible to mount the support 7 with a gap inside the cylindrical rod 8 fastened coaxially inside the body.

Passage 9 for lubricant supply to the gap between the rod 8 and the cage support 7 is provided inside the cylindrical rod 8 and the body 4. Leaving the gap the lubricant, by gravity or splashing, is delivered to the remaining components of the assembly.

The rod 8 may be designed with an outshoot extending beyond the limits of the bearing or body 4.

Alternatively, it is possible to use for each cage separate supports 7 mounted coaxially to the shaft 1 on one cylindrical rod, or each support 7 may be located on its cylindrical rod coaxial to the shaft 1.

The support assembly operates the following way:

When the shaft 1 rotates the inner rings 2 mounted on the shaft 1 transfer the rotation to the roller bodies 5 which impact the cage 6 and make it rotate. In this case the cage 6 rotates with a frequency lower that the rotation frequency of the shaft 1.

The tubular support 7 of the cage slides along the rigidly fastened cylindrical rod 8. During operation oil is supplied under pressure to the passage 9 of the cylindrical rod 8. Through the openings in the rod it enters the gap between the cage support 7 and the rod 8. Due to the above the cage support slides, practically without any friction, over the surface of the rod 8 being supported by the oil film named the oil wedge. Thus, the roller bearings receive loads transferred to them from the shaft, and the support 7 sliding over the rod 8 form together a friction bearing which compensates for the harmful impacts of the centrifugal forces on the cage. It allows the cage and the support assembly to withstand practically any speeds and centrifugal loads. When the supplied lubricant is cooled a thermal factor of the components is reduced.

The gap between the cogged part of the cage and the bearing rings excludes their mutual contact and increases the reliability of the assembly operation. Besides, the location of bearing assemblies at the ends of the shaft excludes a possibility of misalignment. It allows increasing the loads, i.e. to extend the life time of the support assembly.

The load is applied to the shaft in the gap between the bearings.

Such arrangement allows maximizing the use of the strength properties of both the shaft and the bearings to extend the life time and reliability of the assembly operation.

Thus, all the above drawbacks of the known assemblies with the similar application have been eliminated in the design of this bearing assembly.

The invention resolves the task to improve the reliability and durability of the bearing assembly, increase the specific speed and extend the life time.

For this purpose in the support assembly containing the hollow shaft on which at least two roller bearings with cages are mounted at intervals the design of cage support fastening is modified. In the proposed design the cage support is represented by a hollow pipe and located inside the shaft coaxially to the shaft and the cylindrical rod which is fastened on the body and equipped with oil supply passages.

The cage support may be placed on the cylindrical rod with a gap, or the cylindrical rod may be placed with a gap on the cage support. In the proposed design various solutions for the cage separating part may be used; in particular, they can be toothed or riveted.

The cage support and the cylindrical rod may corbel out of the body limits; also, it is possible to design separate cage supports.

In order to reduce friction load cages are installed with a gap in relation to the rings of the roller bearings.

Fastening of the cages on the support passing inside the hollow shaft substitutes the friction between the support and the shaft with the friction between the support and the cylindrical rod located inside the shaft. In this case, due to the decrease of the diameter of contact surfaces friction losses and the linear speed of support sliding movement are reduced, and the load uniformity increases. Besides, due to the location of the support inside the shaft the overall dimensions and weight of the assembly components are reduced.

It brings down the inertia of components rotation and increases the specific speed. Continuous oil supply to the moving parts of the support assembly ensures a long-term uninterrupted operation of the mechanism.

The proposed technical solution can be widely used in machines and mechanisms where bearing assemblies operate with high speeds and are exposed to significant centrifugal loads, in particular in planetary reduction gearing units, planetary gearboxes, planetary centrifugal mills where strong artificial gravity fields exist.

References

USSR Certificate of Authorship No. 176468 of 20 Mar. 1963

USSR Certificate of Authorship No. 1328595 of 13 Jun. 1984

RU Patent No. 2216659

RU Patent No. 1036981

What is claimed is:

1. A support assembly, comprising:
    a body and a shaft in the form of a pipe disposed in the body;
    a cylindrical rod coupled to the body and having oil supply passages; and
    at least two roller bearings including cages mounted on the shaft, the cages having a cage support in the form of a pipe disposed inside the shaft coaxially with the shaft and with the cylindrical rod.

2. The support assembly described in claim 1, wherein the cylindrical rod extends outside of the body.

3. The support assembly described in claim 1, wherein there is a gap between the cages and rings of the roller bearings.

4. A bearing assembly, comprising:
a body having two spaced apart sections;
a cylindrical hollow shaft disposed between the sections;
bearings having cages and selectively coupling the shaft to the sections;
a cylindrical hollow cage support coaxially disposed in the shaft; and
a cylindrical rod rigidly fastened to the body and moveably and coaxially disposed in an opening of the cage support.

5. The assembly of claim 4, wherein the cylindrical rod extends outside of at least one of the sections of the body.

6. The assembly of claim 4, wherein (i) the cylindrical rod comprises passages for supplying oil to interior of the cage support, and (ii) the body comprises at least one oil channel fluidly coupled to the passages.

7. The assembly of claim 4, wherein the bearings are roller bearings.

8. The assembly of claim 4, wherein the cage support comprises members selectively coupled to the cages.

* * * * *